C. T. NOELL.
Hay-Gatherer

No. 159,605.　　　　　　　　　Patented Feb. 9, 1875.

WITNESSES:
E. Neveux
A. F. Terry

INVENTOR:
Chesley Thomas Noell
BY
ATTORNEYS.

UNITED STATES PATENT OFFICE.

CHESLEY THOMAS NOELL, OF CLARKSVILLE, MISSOURI, ASSIGNOR TO HIMSELF AND URIEL GRIFFITH, OF SAME PLACE.

IMPROVEMENT IN HAY-GATHERERS.

Specification forming part of Letters Patent No. 159,605, dated February 9, 1875; application filed December 5, 1874.

*To all whom it may concern:*

Figure 1:
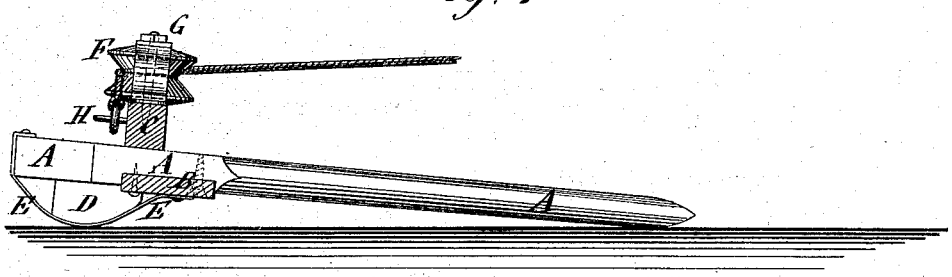
Figure 2:
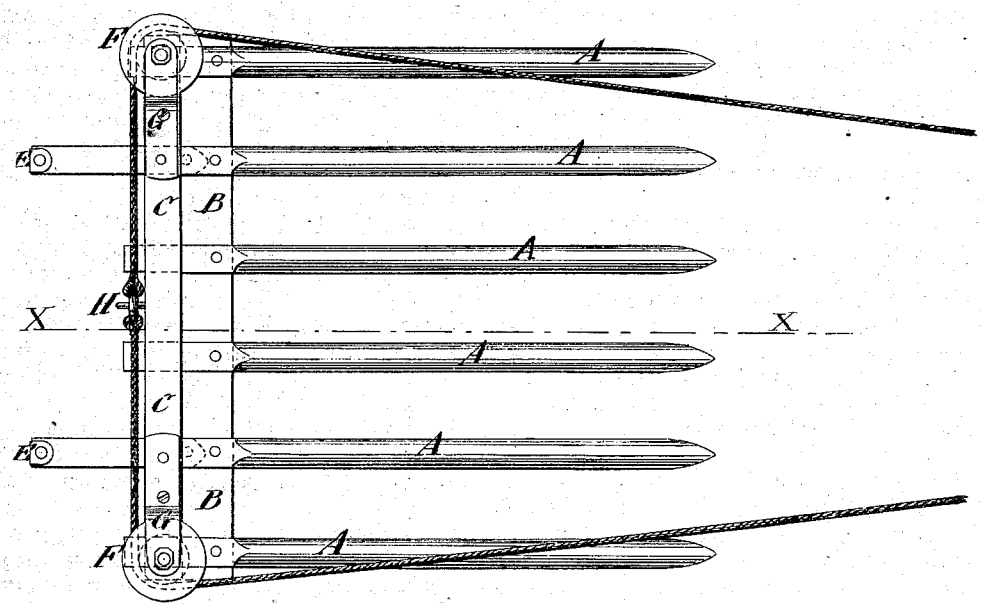

Be it known that I, CHESLEY THOMAS NOELL, of Clarksville, in the county of Pike and State of Missouri, have invented a new and useful Improvement in Hay-Gatherer, of which the following is a specification:

Figure 1 is a vertical longitudinal section of my improved hay-gatherer, taken through the line $x\ x$, Fig. 2. Fig. 2 is a top view of the same.

Similar letters of reference indicate corresponding parts.

The invention relates to an improved device for gathering hay. It consists in a toothed frame or rake provided with pulleys to which the traces or draft appliances are connected, as hereinafter described.

A are the fingers, six, more or less, in number, according to the required width of the gatherer. The rear ends of the teeth A are notched upon their lower sides to receive the board B, and above them is placed a cross-bar, C. The teeth A, board B, and bar C are securely bolted to each other. The next to the outside tooth upon each side is extended a little to the rear, and to said projecting ends and to the board B are attached runners D, which are secured and strengthened by metal straps E which pass along the under side of the said runners D, and their forward ends are secured to the board B. The rear ends of the straps E pass up at the ends of the teeth A, and are secured to the upper side of said ends. Upon the upper side of the ends of the cross-bar C are pivoted two pulleys, F, the upper ends of the pivoting-pins being supported by the braces or arms G, which are attached to the said cross-bar C. To the center of the rear side of the cross-bar C is attached a pin, H, to receive a ring to which the rear ends of the drag-ropes are attached. The drag-ropes are passed around the pulleys F, and their forward ends are attached to the traces of the single horse, by which the gatherer is to be drawn.

With this construction, when the load of hay has been drawn to the place of stacking, the ring is slipped from the pin H and the horse is turned to either side and brought around in rear of the gatherer, the rope being thus drawn across the front side of the pulleys in a position precisely the reverse of that shown in the drawing. The rake may then be drawn from beneath the hay and another load gathered.

Having thus described my invention, I claim as new and desire to secure by Letters Patent—

The combination of the pulleys F and pin H with the gatherer A B C to receive the drag-ropes, substantially as herein shown and described.

CHESLEY THOMAS NOELL.

Witnesses:
J. D. DUVALL,
WM. H. MOSS.